US012670286B2

(12) United States Patent
Luigi

(10) Patent No.: US 12,670,286 B2
(45) Date of Patent: Jun. 30, 2026

(54) SYSTEMS AND METHODS FOR DETERMINISTIC ORDERING AND ENFORCING INTRA-BLOCK FAIRNESS IN DISTRIBUTED LEDGER IMPLEMENTATIONS

(71) Applicant: JPMORGAN CHASE BANK, N.A., New York, NY (US)

(72) Inventor: Mercone Luigi, Manhattan, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 312 days.

(21) Appl. No.: 17/821,082

(22) Filed: Aug. 19, 2022

(65) Prior Publication Data

US 2024/0061949 A1 Feb. 22, 2024

(51) Int. Cl.
*H04L 9/00* (2022.01)
*G06F 21/62* (2013.01)
*G06Q 20/40* (2012.01)

(52) U.S. Cl.
CPC ............ *G06F 21/6227* (2013.01); *H04L 9/50* (2022.05); *G06Q 20/405* (2013.01); *H04L 2209/466* (2013.01)

(58) Field of Classification Search
CPC ..... H04L 63/02; H04L 9/50; H04L 2209/466; G06F 21/6227; G06F 21/60; G06Q 20/405
See application file for complete search history.

(56) References Cited

U.S. PATENT DOCUMENTS

2015/0242945 A1* 8/2015 Park ....................... G06Q 30/08
705/26.3
2018/0123882 A1* 5/2018 Anderson ............... H04L 43/16
(Continued)

FOREIGN PATENT DOCUMENTS

CN 111885050 11/2020
CN 111885050 A * 11/2020 ............. H04L 63/02

OTHER PUBLICATIONS

He, Zhiguo, and Jiasun Li. "Contract enforcement and decentralized consensus: The case of slashing." Available at SSRN 4036000 (2022) (Year: 2022).*

(Continued)

*Primary Examiner* — William R Korzuch
*Assistant Examiner* — Aditya Sriram
(74) *Attorney, Agent, or Firm* — GREENBERG TRAURIG LLP

(57) ABSTRACT

Systems and methods for deterministic ordering and enforcing intra-block fairness in distributed ledger implementations are disclosed. According to one embodiment, a method for deterministic ordering and enforcing intra-block fairness in distributed ledger implementations may include: (1) receiving, at a hardware security module at one of a plurality of nodes in a distributed ledger network, arbitrary ordering logic based on a definition of fairness agreed to by the plurality of nodes; (2) receiving, by the hardware security module, a plurality of transactions for execution; (3) ordering, by the hardware security module, the plurality of transactions based on the arbitrary ordering logic; and (4) outputting, by the hardware security module, the plurality of transactions as an ordered set of transactions; wherein a consensus algorithm executed by the distributed ledger network commits the ordered set of transactions to the distributed ledger as a block.

12 Claims, 3 Drawing Sheets

(56) References Cited

U.S. PATENT DOCUMENTS

| | | | | |
|---|---|---|---|---|
| 2020/0112443 A1* | 4/2020 | Todd | ..................... | H04L 9/3255 |
| 2020/0160326 A1* | 5/2020 | Sarin | ................... | G06Q 20/102 |
| 2020/0177372 A1* | 6/2020 | Bhamidipati | ............. | H04L 9/50 |
| 2020/0242604 A1* | 7/2020 | Falk | ...................... | H04L 9/3236 |
| 2020/0374113 A1 | 11/2020 | Noam et al. | | |
| 2021/0073197 A1* | 3/2021 | Setty | .................. | G06F 16/2336 |
| 2021/0398116 A1* | 12/2021 | Fang | ................ | G06Q 20/38215 |
| 2022/0100733 A1* | 3/2022 | Tock | .................... | H04L 9/3239 |
| 2023/0073427 A1* | 3/2023 | Berg | ................... | G06Q 20/389 |

OTHER PUBLICATIONS

International Search Report and Written Opinion of the International Searching Authority, dated Nov. 17, 2023, from corresponding International Application No. PCT/US2023/072394.

Sokolik, Yaakov; et al., "Age-aware Fairness in Blockchain Transactions Ordering", IEEE/ACM 28th International Symposium on Quality of Service (IWQOS), Jun. 15, 2020, pp. 1-9.

Heimbach, Lioba; et al., "Sok: Preventing Transaction Reordering Manipulations in Decentralized Finance", Cornell University Library, Mar. 22, 2022, pp. 5-12.

* cited by examiner

SYSTEMS AND METHODS FOR DETERMINISTIC ORDERING AND ENFORCING INTRA-BLOCK FAIRNESS IN DISTRIBUTED LEDGER IMPLEMENTATIONS

BACKGROUND OF THE INVENTION

1. Field of the Invention

Embodiments relate generally to systems and methods for deterministic ordering and enforcing intra-block fairness in distributed ledger implementations.

2. Description of the Related Art

The consensus mechanisms within the most widely adapted distributed ledger protocols all contain challenges and limitations that constrain their utility and applicability to the broad spectrum of business use cases within the financial services industry. Two of these challenges center on the notions of deterministic transaction ordering and "fairness." To the degree that a distributed ledger protocol assures order, if it can be said to do so, it is at a very coarse level of granularity, namely at the "block" level, and by and large is silent on the topic of "fairness."

A block can, and typically does, contain multiple transactions. For example, a block in the Ethereum protocol typically contains several hundred transactions, and the protocol itself provides robust mechanisms for assuring the consistent and reliable ordering of blocks. The protocol, however, does not provide for any means to assure any sort of determinism in the ordering within any given block. This lack of determinism significantly constrains the applicability of distributed ledger, in that there are many banking business flows that are critically dependent on well-understood, reliable and trusted by all mechanisms for enforcing transaction order (e.g., sequence numbering and high precision time-stamps) across an arbitrary number of participants.

For example, there are many market facing situations where there would be potentially significant advantage to a participant by knowingly manipulating the ordering within a block, thereby assuring that a specific type of transaction or counterparty was always first, or always last, or by changing the order within a block to create a potential arbitrage or front running opportunity. The current protocol limitations and regulatory ambiguity (as strictly speaking, this type of manipulation is not prohibited, nor could its presence be reliably detected) constrain on how and where the benefits of distributed ledger could be brought to bear, particularly in the type of private, small number of participant node networks that large scale commercial and institutional banks would primarily operate in.

By design, the distributed, decentralized nature of distributed ledger both precludes the use of a common, centralized authority for transaction sequencing. The usual methods of high precision time stamps used in centralized traditional markets cannot address this challenge, namely due to inconsistent and unpredictable network propagation delays inherent to distributed ledger's distributed, decentralized design. And rules or business logic that may be expressed in the form of a smart contract within any given transaction are instead applied as a wrapper or superset around all transactions.

SUMMARY OF THE INVENTION

Systems and methods for deterministic ordering and enforcing intra-block fairness in distributed ledger implementations are disclosed. According to one embodiment, a method for deterministic ordering and enforcing intra-block fairness in distributed ledger implementations may include: (1) receiving, at a hardware security module at one of a plurality of nodes in a distributed ledger network, arbitrary ordering logic based on a definition of fairness agreed to by the plurality of nodes; (2) receiving, by the hardware security module, a plurality of transactions for execution; (3) ordering, by the hardware security module, the plurality of transactions based on the arbitrary ordering logic; and (4) outputting, by the hardware security module, the plurality of transactions as an ordered set of transactions; wherein a consensus algorithm executed by the distributed ledger network commits the ordered set of transactions to the distributed ledger as a block.

In one embodiment, the arbitrary ordering logic may be based on an attribute of a party to a transaction, an attribute of a counterparty to the transaction, or an attribute of the transaction.

In one embodiment, the arbitrary ordering logic may include a plurality of levels of arbitrary ordering logic.

In one embodiment, the arbitrary ordering logic may specify a restriction on a number of transactions in a period.

In one embodiment, the arbitrary ordering logic may specify a restriction on a value of transactions in a period.

In one embodiment, the hardware security module may also output a checksum or hash of the arbitrary ordering logic, and the checksum or hash may be written with the set of ordered transactions in the block.

According to another embodiment, a system may include a distributed ledger network comprising a plurality of nodes, wherein each node comprises a hardware security module comprising arbitrary ordering logic based on a definition of fairness agreed to by the plurality of nodes, and a consensus algorithm executed by the plurality of nodes. One of the hardware security modules at one of a plurality of nodes may receive a plurality of transactions for execution, may order the plurality of transactions based on the arbitrary ordering logic, and may output the plurality of transactions as an ordered set of transactions. The plurality of nodes may reach a consensus for the ordered set of transactions using the consensus algorithm and may write the ordered set of transactions as a block to the distributed ledger network.

In one embodiment, the arbitrary ordering logic may be based on an attribute of a party to a transaction, an attribute of a counterparty to the transaction, or an attribute of the transaction.

In one embodiment, the arbitrary ordering logic may include a plurality of levels of arbitrary ordering logic.

In one embodiment, the arbitrary ordering logic may specify a restriction on a number of transactions in a period.

In one embodiment, the arbitrary ordering logic may specify a restriction on a value of transactions in a period.

In one embodiment, the hardware security module may also output a checksum or hash of the arbitrary ordering logic, and the checksum or hash may be written with the set of ordered transactions in the block.

According to another embodiment, a hardware security module at one of a plurality of nodes in a distributed ledger network may include a computer processor and a memory storing a computer program. When executed by the computer processor, the computer program may receive arbitrary ordering logic based on a definition of fairness agreed to by the plurality of nodes; receive a plurality of transactions for execution; order the plurality of transactions based on the arbitrary ordering logic; and output the plurality of transactions as an ordered set of transactions. A consensus algorithm executed by the distributed ledger network may commit the ordered set of transactions to the distributed ledger as a block.

In one embodiment, the arbitrary ordering logic may be based on an attribute of a party to a transaction, an attribute of a counterparty to the transaction, or an attribute of the transaction.

In one embodiment, the arbitrary ordering logic may include a plurality of levels of arbitrary ordering logic.

In one embodiment, the arbitrary ordering logic may specify a restriction on a number of transactions in a period.

In one embodiment, the arbitrary ordering logic may specify a restriction on a value of transactions in a period.

In one embodiment, the computer program may output a checksum or hash of the arbitrary ordering logic, and the checksum or hash may be written with the set of ordered transactions in the block.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for deterministic ordering and enforcing intra-block fairness in distributed ledger implementations.

"Fairness" is an arbitrary construct. As used herein, "fairness" is any arbitrary set of rules-based business logic that is agreed upon and accepted by all participants, where there are sufficiently robust mechanisms in place to ensure all participants that those rules are consistently applied across all participants, that any systemic break or failure of the technology to apply those rules was readily detected, as was any attempt by a network participant to deliberately, inadvertently or maliciously manipulate or circumvent those rules. As an example, if the participants of a private distributed ledger network agree that fair intra-block ordering is determined by an alphanumeric sort order of an agreed upon identifier of the originating party, so long as this is reliably, consistently and confidently applied across all participating nodes in the network, the network can be said to be operating in a fair manner.

Embodiments may use a hardware security module (HSM) or similar to assert agreed upon, robust, reliable, consistent and trustworthy arbitrary logic across all participating nodes in a distributed ledger network, as well as to maintain such arbitrary logic.

Figure 1:
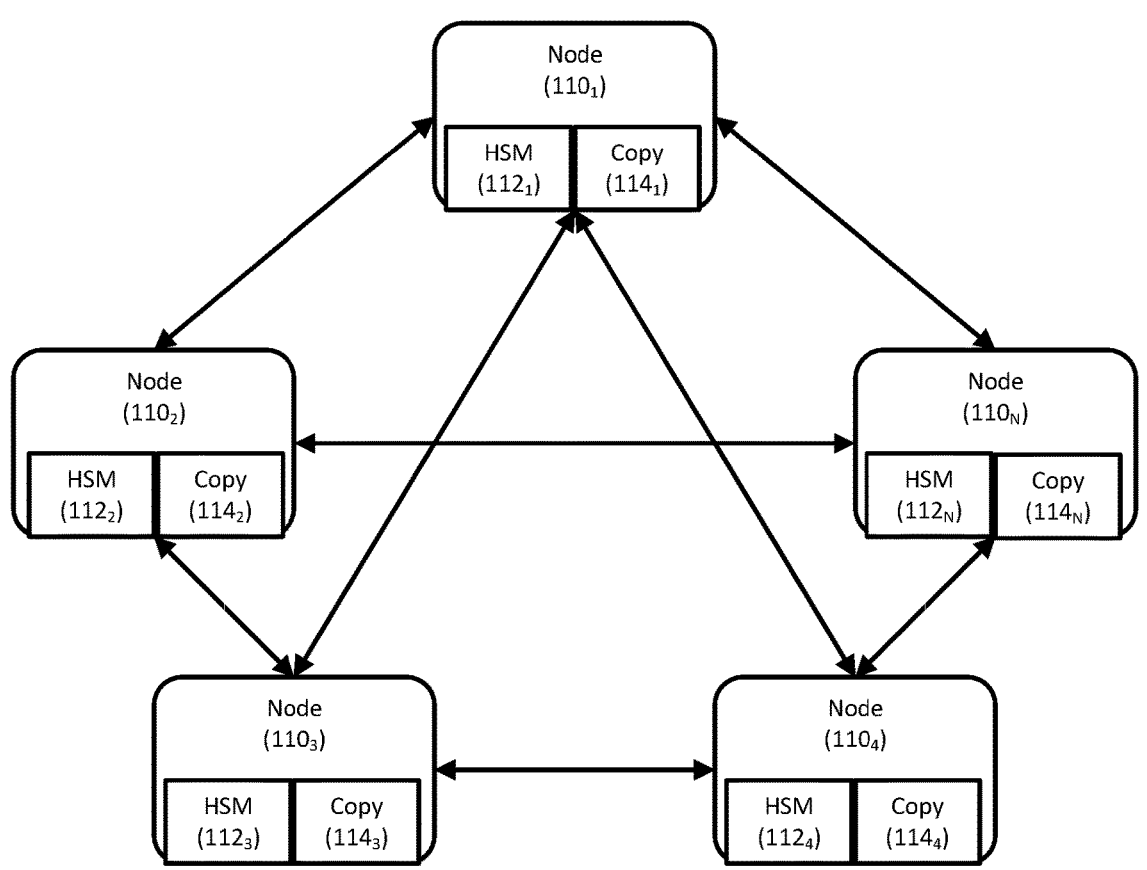
FIG. 1 depicts a system for deterministic ordering and enforcing intra-block fairness in distributed ledger implementations according to an embodiment.
Figure 1:
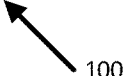

Referring to FIG. 1, a system for deterministic ordering and enforcing intra-block fairness in distributed ledger implementations is disclosed according to an embodiment. System 100 may include a plurality of nodes (e.g., node $1101$, node $1102$, node $1103$, node $1104$, . . . node 110N in a distributed ledger network. In one embodiment, the distributed ledger network may be a blockchain-based distributed ledger network, in which a consensus algorithm may operate on nodes 110 and may update the blockchain-based distributed ledger. Multiple copies (e.g., copy 1141, copy 1142, copy 1143, copy 1144, . . . copy 114N) of the blockchain-based distributed ledger exist across the nodes 110. Transactions submitted by nodes 110 may be grouped and added as a block to the blockchain-based distributed ledger.

Each node 110 may include hardware security module (HSM) 112 (e.g., HSM $112_1$, HMS $112_2$, HSM $112_3$, HSM $112_4$, . . . HSM $112_N$). HSM 112 may store arbitrary ordering logic that represents the definition of fairness that may be agreed to by node 110. HSMs 112 may be physical computing devices may that have features that provide tamper evidence such as visible signs of tampering or logging and alerting, or tamper resistance which makes tampering difficult without making HSM 112 inoperable. The nodes may periodically agree to an order in which transactions are to be executed based on any suitable logic. For example, nodes 110 may agree that transactions from node 1101 are always executed first, transactions from node 1102 are always executed second, transactions from node 1103 are always executed third, transactions from node 1104 are always executed fourth, and so on. As another example, the nodes may agree that the order of execution will rotate. As another example, the ordering may be random. As still another example, the transactions may be ordered based on transaction amount, geographical location, the order in which they are submitted (e.g., first in first out, last in first out, etc.), alphabetically (e.g., based on party name), order size (e.g., number of units, monetary value, etc.), size of stake in a proof-of-stake blockchain, etc. In another embodiment, a party may bid on a slot and the other parties may be compensated by the winning bid, etc. Any other suitable logic that may be agreed to by the parties may be used as is necessary and/or desired.

HSMs 112 may all run the same code, and may enforce the same notion of fairness. The robustness of HSMs 112 protects the integrity of the code. HSMs 112 may also ensure that the operating environment is inside a secure bastion that is inherently resistant to manipulation. The digital signature of the deployed code can be verified as consistent across HSMs 112.

HSMs 112 may operate independently of the consensus algorithm. For example, HSMs 112 may provide deterministic ordering within a block, while the consensus algorithm assures consistent ordering of the blocks.

Thus, the blockchain asserts the consistency of the contents of the block, and HSMs 112 assert the consistency of the ordering logic. Each HSM 112 independently performs the ordering using the same pool of transactions and the same ordering logic. Because of this, HSMs 112 should each independently arrive at the same outcome. If one or more node 110 diverges, the consensus mechanism intrinsic to the blockchain will assure that (within the capabilities of the blockchain protocol) the desired ordering is accepted and committed. This also serves to identify potentially pathological nodes 110 (e.g., unhealthy, maligned, etc.). Embodiments may provide a self-evidencing of deviance. As every node is looking at the same inputs, if a node produces divergent output from its peers, it will be obvious.

Examples of transactions that may be ordered include banking transactions, e-commerce transactions, investment transactions, etc.

In another embodiment, instead of HSM 112, code that includes security instructions (e.g., Intel®'s SGX) may be used. For example, a wrapper may be used with code that attests to the digital signature of the running code.

Figure 2:
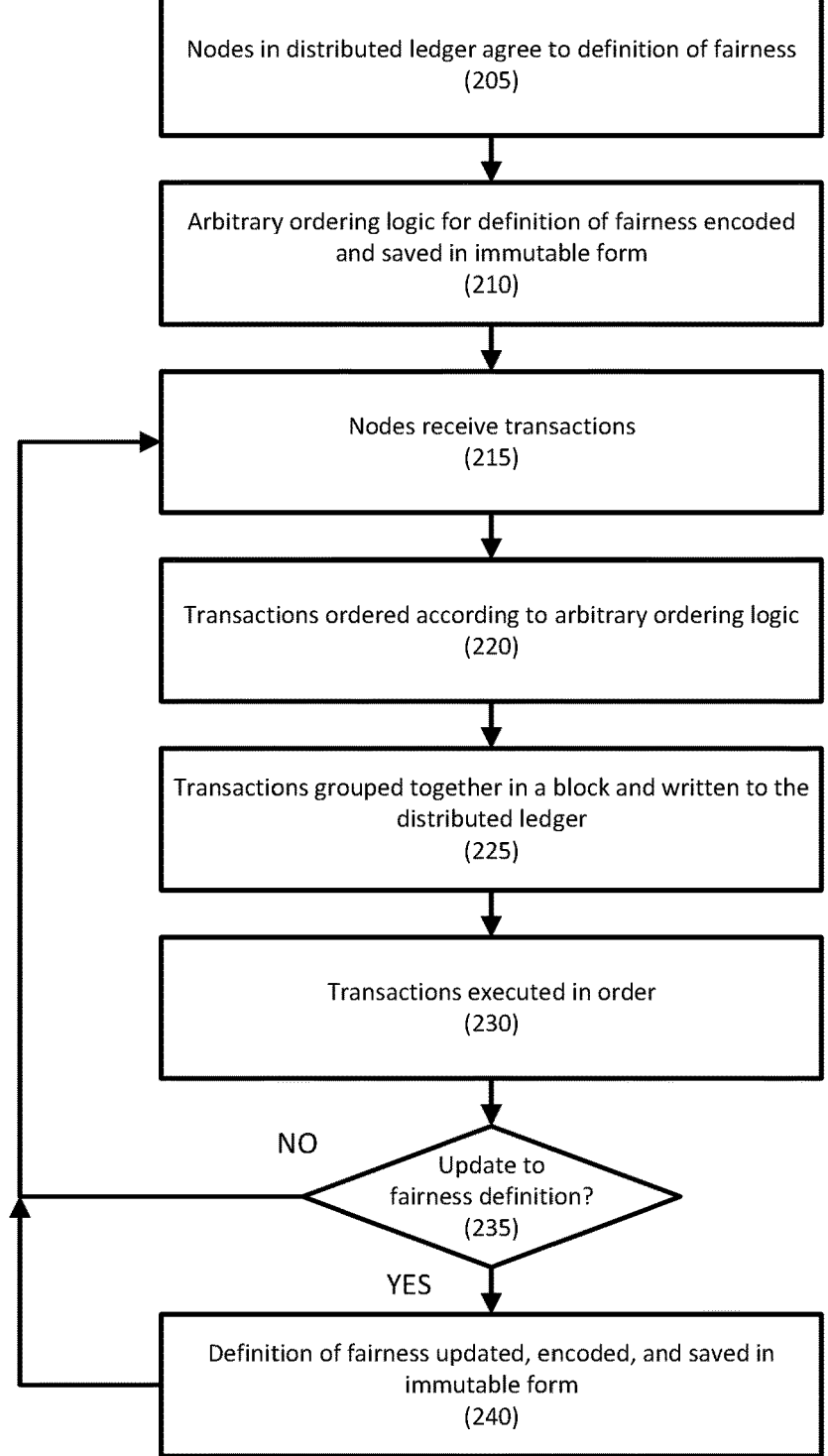
FIG. 2 depicts a method for deterministic ordering and enforcing intra-block fairness in distributed ledger implementations according to an embodiment.

Referring to FIG. 2, a method for deterministic ordering and enforcing intra-block fairness in distributed ledger implementations is disclosed according to an embodiment.

In step 205, a plurality of nodes in a distributed ledger network may agree to a definition of fairness. Any manner in which the nodes may agree may be used. For example, one node may propose the definition of fairness, and the other nodes may agree, or modify the definition of fairness, until all nodes agree to the definition of fairness. In one embodiment, the definition of fairness may specify an order in which transactions are to be ordered within a block, which also specifies the order of execution of the transaction.

The definition of fairness may be expressed as arbitrary ordering logic. The arbitrary ordering logic may be based on attributes of the party, counterparty, or the transaction. For example, if counterparty is a Ukrainian financial institution, that transaction will get preferential execution, or if transaction is on the basis of an Environmental, Social, and Governance (ESG) compliant security, that transaction will get preferential treatment.

In one embodiment, the definition of fairness may specify several levels in case there is an ordering "tie."

In one embodiment, the definition of fairness may further specify rules for what volume or value of transactions may be permitted in any given time period for a user. For example, a node may restrict the number of transactions per day, a dollar amount of transactions per day, etc. This may reduce risk and minimize the impact of fraud, a runaway upstream system or program, human error, etc.

In step 210, the definition of fairness may be encoded into arbitrary ordering logic and saved in immutable form. In one embodiment, the definition may be expressed as computer code, and may be written to a hardware security module or similar.

In another embodiment, the arbitrary ordering logic may be written to the distributed ledger and a smart contract may be programmed to execute the code. For example, the arbitrary ordering logic may be written to a smart contract (e.g., pre-processing the payload for a block) that is embedded within a blockchain with wrapped around a second blockchain that receives serialized transactions.

In step 215, the nodes may receive a plurality of transactions, such as banking transactions, e-commerce transactions, investment transactions, etc. In one embodiment, each node may submit a transaction by writing it to its copy of the distributed ledger.

In one embodiment, transactions received but not yet committed to the chair may be persisted to a pending buffer known as a "mempool." To the extent that any ordering occurs, in Ethereum, for example, the ordering may be based on the gas fee. If all the node spaces in the mempool are full but the timer to mine the next block has not yet expired, the transaction with the lowest gas fee will be dropped.

Once a block is mined, and consensus is achieved, the block may be written to the ledger.

In step 220, the HSMs may receive the transactions and may order them according to the arbitrary ordering logic. In one embodiment, the ordering logic may examine the mempool of each node and may then deterministically order the transactions using the logic it embodies. For example, the transactions are not ordered based on the order in which they are received, but instead based on non-temporal attributes, such as a name of a counterparty, a value of transaction, etc. specified in the arbitrary ordering logic in and enforced by the HSMs.

The HSMs may then output chunks of ordered transactions to be consumed as a whole by the blockchain.

In step 225, the ordered transactions may be grouped together in a block and written to the distributed ledger, and the consensus algorithm may commit the block to the distributed ledger. In one embodiment, the definition of fairness or a reference thereto may be included in the block for future retrieval and/or audit purposes. In one embodiment, the first or last node of a block may be reserved for a cryptographically robust checksum, a hash, etc. of the arbitrary ordering logic that was used to determine the ordering of the transactions within the block. The encoded arbitrary ordering logic cannot be changed mid-block.

In step 230, the transactions may be executed in the order that they are presented in the block. For example, an external system may monitor the distributed ledger and execute the transactions based on the ordering within the block.

Embodiments may provide a zero trust mechanism for assuring ordering across multiple, untrusting parties and then each participant can then subsequently independently transact as they see fit within their own proprietary systems. Alternatively, embodiments may provide a mechanism for ordering amongst private network participants, the output of which may be provided to a trusted third party, such as a relevant exchange or if they all have a custodian in common, a network of custodians who want to collaborate, etc. thereby creating a "light pool" where these orders can be internally crossed and never go to market.

In step 235, if there is an update to the definition of fairness, in step 240, the updated definition of fairness may be encoded and saved in immutable form. This may be similar to step 210, above.

When completed transactions are retrieved, the order of actual execution may be compared to the arbitrary ordering logic to confirm that the transactions were executed in the order agreed to in the definition of fairness. For example, if a checksum, hash or similar is included in the block, the arbitrary ordering logic may be identified, and the order may be compared to the arbitrary ordering logic to confirm that the order of execution was correct.

Depending on the consensus protocol in use, networks with a small number of nodes may be especially vulnerable to either a malicious or an otherwise pathologically malfunctioning node that effectively create a Denial of Service type of attack, thereby degrading or stopping the network from being able to reach consensus and create new blocks. This is a function of the common protocols in their design having made the assumption that they would have thousands, tens of thousands of nodes, and thus it would take a coordinated network of misbehaving nodes to have a noticeable impact. In a small private, permissioned network, a single misbehaving node could paralyze the entire network.

Thus, in embodiments, logic may be embedded in the HSMs with agreed upon rules for what represents malicious or malfunctioning behavior. When such behavior is identified by one of the HSMs, the node in question may be isolated from the rest of the network. To be readmitted to the network, the node may have to pass health checks, such as checks defined in logic. Similar to fairness, all participants would have to agree on those health checks and all implement them.

In one embodiment, an out-of-band limit checker may be provided. The out-of-band limit checker may be provided on an entirely disjoint code path, process, infrastructure, etc. and may independently observes the behavior of system, such as a trading system. If the behavior exceeds certain limits, the limit checker can terminate, freeze, disconnect, etc. the system autonomously.

Thus, in embodiments, the set of HSMs may not only govern the ordering of transactions within a block, but they may also include a separate set of arbitrary logic to observe the behavior of the nodes in the blockchain and being able to eject pathological node(s). In one embodiment, a second set of HSMs may provide this functionality.

Figure 3:
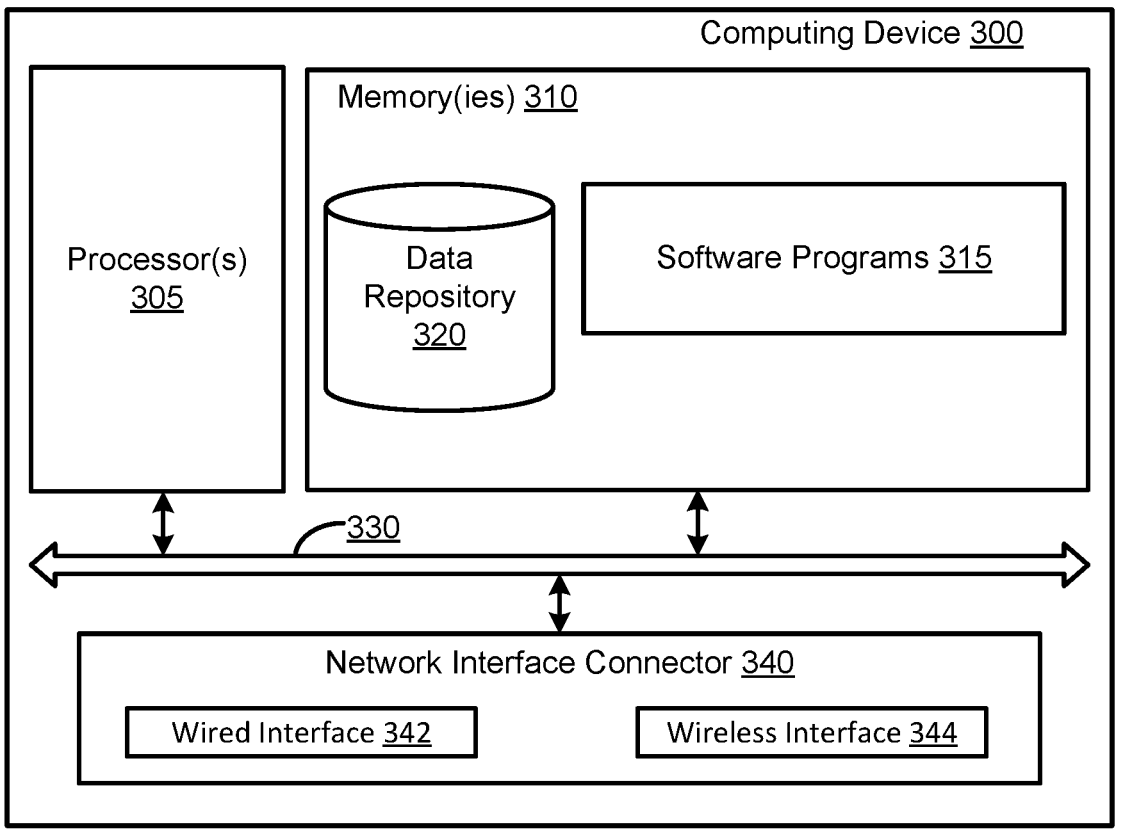
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may include cloud-based processors.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disc, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for deterministic ordering and enforcing intra-block fairness in distributed ledger implementations, comprising:

receiving, at a plurality of hardware security modules each at one of a plurality of nodes in a distributed ledger network, arbitrary ordering logic based on a definition of fairness agreed to by the plurality of nodes, wherein the arbitrary ordering logic comprises a plurality of levels, wherein the each level of the plurality of levels is configured to be sequentially applied to break an ordering tie thereby determining an order to execute a plurality of transactions, wherein the arbitrary ordering logic includes a restriction on a number of transactions within a time period, wherein the arbitrary ordering logic includes a level of the plurality of levels where a plurality of parties bid on a slot and one party of the plurality of parties is compensated by a winning bid;

receiving, by one hardware security module of the plurality of hardware security modules and from the plurality of nodes, the plurality of transactions for execution;

ordering, by the one hardware security module of the plurality of hardware security modules, the plurality of transactions based on the plurality of levels of the arbitrary ordering logic and the number of transactions, wherein each hardware security module of the plurality of hardware security modules independently arrives at an output ordering;

identifying, by the one hardware security module of the plurality of hardware security modules, a pathological node of the plurality of nodes based on a divergent ordering differing from the output ordering, wherein the identifying is based on a threshold of divergence over a plurality of blocks, and the pathological node is excluded from consensus for a defined period; and outputting, by the hardware security module, the plurality of transactions as an ordered set of transactions;

wherein a consensus algorithm executed by the distributed ledger network commits the ordered set of transactions to the distributed ledger as a block.

2. The method of claim 1, wherein the arbitrary ordering logic is based on an attribute of a counterparty to the transaction.

3. The method of claim 1, wherein the arbitrary ordering logic specifies a restriction on a value of transactions in the time period.

4. The method of claim 1, wherein the hardware security module further outputs a checksum or hash of the arbitrary ordering logic, and the checksum or hash is written with the set of ordered transactions in the block.

5. A system, comprising:

a distributed ledger network comprising a plurality of hardware security modules each at one of a plurality of nodes, wherein each node comprises a hardware security module comprising arbitrary ordering logic based on a definition of fairness agreed to by the plurality of nodes, wherein the arbitrary ordering logic comprises a plurality of levels, wherein the each level of the plurality of levels is configured to be sequentially applied to break an ordering tie thereby determining an order to execute a plurality of transactions, wherein the arbitrary ordering logic includes a restriction on a number of transactions within a time period, wherein the arbitrary ordering logic includes a level of the plurality of levels where a plurality of parties bid on a slot and one party of the plurality of parties is compensated by a winning bid; and a consensus algorithm executed by the plurality of nodes; wherein:

one of the hardware security modules of the plurality of hardware security modules receives from the plurality of nodes, the plurality of transactions for execution;

the one of the hardware security modules orders the plurality of transactions based on the plurality of levels of the arbitrary ordering logic and the number of transactions, wherein each hardware security module of the plurality of hardware security modules independently arrives at an output ordering;

the one of the hardware security modules outputs the plurality of transactions as an ordered set of transactions;

a second hardware security module produces a divergent ordering;

the plurality of nodes reach consensus for the ordered set of transactions using the consensus algorithm;

the plurality of nodes identifies a pathological node of the plurality of nodes based on the divergent ordering differing from the ordered set of transactions, wherein the identifying is based on a threshold of divergence over a plurality of blocks, and the pathological node is excluded from consensus for a defined period; and the consensus algorithm writes the ordered set of transactions as a block to the distributed ledger network.

6. The system of claim 5, wherein the arbitrary ordering logic is based on an attribute of a counterparty to the transaction.

7. The system of claim 5, wherein the arbitrary ordering logic specifies a restriction on a value of transactions in the time period.

8. The system of claim 5, wherein the hardware security module further outputs a checksum or hash of the arbitrary ordering logic, and the checksum or hash is written with set of ordered transactions in the block.

9. A hardware security module at one of a plurality of nodes in a distributed ledger network, comprising:

a computer processor; and a memory storing a computer program;

wherein, when executed by the computer processor, the computer program:

receives arbitrary ordering logic based on a definition of fairness agreed to by the plurality of nodes, wherein the arbitrary ordering logic comprises a plurality of levels, wherein the each level of the plurality of levels is configured to be sequentially applied to break an ordering tie thereby determining an order to execute a plurality of transactions, wherein the arbitrary ordering logic includes a restriction on a number of transactions within a time period, wherein the arbitrary ordering logic includes a level of the plurality of levels where a plurality of parties bid on a slot and one party of the plurality of parties is compensated by a winning bid;

receives, by one hardware security module of the plurality of hardware security modules and from the plurality of nodes, the plurality of transactions for execution;

orders, by the one hardware security module of the plurality of hardware security modules, the plurality of transactions based on the plurality of levels of the arbitrary ordering logic and the number of transactions, wherein each hardware security module of the plurality of hardware security modules independently arrives at an output ordering;

identifies, by the one hardware security module of the plurality of hardware security modules, a pathological node of the plurality of nodes based on a divergent ordering differing from the output ordering, wherein the identifying is based on a threshold of divergence over a plurality of blocks, and the pathological node is excluded from consensus for a defined period; and outputs the plurality of transactions as an ordered set of transactions;

wherein a consensus algorithm executed by the distributed ledger network commits the ordered set of transactions to the distributed ledger as a block.

10. The hardware security module of claim 9, wherein the arbitrary ordering logic is based on an attribute of a counterparty to the transaction.

11. The hardware security module of claim 9, wherein the arbitrary ordering logic specifies a restriction on a value of transactions in the time period.

12. The hardware security module of claim 9, wherein the computer program outputs a checksum or hash of the arbitrary ordering logic, and the checksum or hash is written with the set of ordered transactions in the block.

* * * * *